US012548188B2

(12) United States Patent
Wang et al.

(10) Patent No.: US 12,548,188 B2
(45) Date of Patent: Feb. 10, 2026

(54) METHOD FOR DETERMINING HAND POSITION INFORMATION AND RELATED DEVICE

(71) Applicant: SHENZHEN HITEVISION TECHNOLOGY CO., LTD., Guangdong (CN)

(72) Inventors: Xiang Wang, Guangdong (CN); Lisen Zhu, Guangdong (CN); Hongwei Sun, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 272 days.

(21) Appl. No.: 18/286,565

(22) PCT Filed: Dec. 30, 2021

(86) PCT No.: PCT/CN2021/143072
§ 371 (c)(1),
(2) Date: Oct. 12, 2023

(87) PCT Pub. No.: WO2023/284264
PCT Pub. Date: Jan. 19, 2023

(65) Prior Publication Data
US 2024/0221205 A1 Jul. 4, 2024

(30) Foreign Application Priority Data
Jul. 12, 2021 (CN) .......................... 202110783937.0

(51) Int. Cl.
*G06T 7/73* (2017.01)
*G06T 7/60* (2017.01)
(52) U.S. Cl.
CPC .................. *G06T 7/73* (2017.01); *G06T 7/60* (2013.01); *G06T 2207/30196* (2013.01)

(58) Field of Classification Search
CPC ... G06T 7/73; G06T 7/60; G06T 2207/30196; G06T 2207/20084; G06T 7/75; G06T 7/74; G06F 3/017; G06V 40/107; G06V 40/28
(Continued)

(56) References Cited

U.S. PATENT DOCUMENTS 10,803,616 B1 10/2020 Twigg et al.
2014/0373647 A1 12/2014 Stengle et al.
(Continued)

FOREIGN PATENT DOCUMENTS

CN 102156994 A 8/2011
CN 102778953 * 6/2015
(Continued)

OTHER PUBLICATIONS

The International search report for PCT Application No. PCT/CN2021/143072, dated Mar. 23, 2022, 4 pages.
(Continued)

*Primary Examiner* — Jerome Grant, II
(74) *Attorney, Agent, or Firm* — East IP P.C.

(57) ABSTRACT

The present application discloses a method for determining hand position information and a related device. The method includes: determining, according to a human skeleton detection model, position information of key part joint points of a human object in an image in a preset coordinate system; determining, according to position information of the head key part joint point and position information of the first part joint point, a height difference between the head key part joint point and the first part joint point; determining, according to the height difference, a hand size of the human object; determining position information of feature points according to the hand size, position information of the elbow joint point and position information of the wrist joint point, (Continued)

wherein the feature points are feature points of a preset shape surrounding a hand area; and determining the position information of the feature points as hand position information.

16 Claims, 6 Drawing Sheets

(58) Field of Classification Search
USPC .......................................................... 382/103
See application file for complete search history.

(56) References Cited

U.S. PATENT DOCUMENTS

| | | |
|---|---|---|
| 2017/0011519 A1 | 1/2017 | Ohba et al. |
| 2020/0334904 A1 | 10/2020 | Chang et al. |
| 2021/0042510 A1* | 2/2021 | Tian .................... G06V 40/171 |
| 2021/0174519 A1 | 6/2021 | Bazarevsky et al. |

FOREIGN PATENT DOCUMENTS

| | | | | |
|---|---|---|---|---|
| CN | 105469113 | A | | 4/2016 |
| CN | 105893929 | A | | 8/2016 |
| CN | 105786016 | | * 11/2019 | ............. G05D 1/101 |
| CN | 111950341 | A | | 11/2020 |
| CN | 113609917 | A | | 11/2021 |
| JP | 2020198019 | A | | 12/2020 |
| KR | 1020070120443 | A | | 12/2007 |
| KR | 20190104663 | | * 9/2019 | ........... A61B 5/1072 |

OTHER PUBLICATIONS

Bao Yingying et al., "Real-time Gesture Recognition Scheme Key Frame and Posture Description Language" Natural Science Journal of Xiangtan University, vol. 38 No. 3, Sep. 30, 2016, 6 pages.
The Grant Notification of Chinese Application No. 202110783937.0, dated Jul. 1, 2022, 8 pages.
The extended European search report for European Application No. 21950035.2, dated Jul. 8, 2024, 7 pages.

* cited by examiner

METHOD FOR DETERMINING HAND POSITION INFORMATION AND RELATED DEVICE

CROSS-REFERENCE TO RELATED APPLICATION

The present application is a National Stage of International Application No. PCT/CN2021/143072 filed on Dec. 30, 2021, which claims priority to Chinese Patent Application No. 202110783937.0 filed on Jul. 12, 2021, and titled "METHOD FOR DETERMINING HAND POSITION INFORMATION AND RELATED DEVICE", both of which are hereby incorporated by reference in their entireties.

TECHNICAL FIELD

The present application relates to the technology field of image recognition, and particularly, to a method for determining hand position information and a related device.

BACKGROUND

A bottom-up AI (Artificial Intelligence) algorithm for a human posture estimation in the related art can detect all key points of a human body in an image, and connect joint points of the same person into a whole skeleton. Typical key parts of the human body can be detected by the AI algorithm, such as a nose, a neck, left and right eyes, left and right ears, left and right shoulder joints, left and right elbow joints, left and right wrist joints, left and right hip joints, left and right knee joints, and left and right ankle joints.

However, the algorithm for the human posture estimation cannot directly detect hand position information of a human object in the image, and thus cannot recognize an overall posture of the human object. Accordingly, how to recognize rapidly the hand position information of the human object in the image based on the existing algorithm for the human posture estimation has become an urgent problem to be solved.

SUMMARY

The embodiments of the present application provide a method and an apparatus for determining hand position information, an electronic device, a computer storage medium and a computer program product.

In a first aspect, embodiments of the present application provide a method for determining hand position information, and the method includes:
  determining, according to a human skeleton detection model, position information of key part joint points of a human object in an image in a preset coordinate system, in which the key part joint points include at least a head key part joint point, a first part joint point, an elbow joint point and a wrist joint point, and the first part joint point includes a neck joint point or a shoulder joint point;
  determining, according to position information of the head key part joint point and position information of the first part joint point, a height difference between the head key part joint point and the first part joint point;
  determining, according to the height difference, a hand size of the human object;
  determining position information of feature points according to the hand size, position information of the elbow joint point and position information of the wrist joint point, in which the feature points are feature points of a preset shape surrounding a hand area of the human object; and
  determining the position information of the feature points as the hand position information of the human object.

In a second aspect, the embodiments of the present application provide an apparatus for determining hand position information, and the apparatus includes:
  a first position determination module configured to determine, according to a human skeleton detection model, position information of key part joint points of a human object in an image in a preset coordinate system, in which the key part joint points include at least a head key part joint point, a first part joint point, an elbow joint point and a wrist joint point, and the first part joint point includes a neck joint point or a shoulder joint point;
  a height difference determination module configured to determine, according to position information of the head key part joint point and position information of the first part joint point, a height difference between the head key part joint point and the first part joint point;
  a hand size determination module configured to determine, according to the height difference, a hand size of the human object;
  a second position determination module configured to determine position information of feature points according to the hand size, position information of the elbow joint point and position information of the wrist joint point, in which the feature points are feature points of a preset shape surrounding a hand area of the human object; and a third position determination module configured to determine the position information of the feature points as the hand position information of the human object.

In a third aspect, the embodiments of the present application provide an electronic device including a processor and a memory storing computer program instructions;
  in which the computer program instructions, when executed by the processor, implement the method for determining the hand position information according to according the first aspect.

In a fourth aspect, the embodiments of the present application provide a computer storage medium having computer program instructions stored thereon, in which the computer program instructions, when executed by a processor, implement the method for determining the hand position information according to the first aspect.

In a fifth aspect, the embodiments of the present application provide a computer program product including computer programs or instructions, in which the computer programs or instructions, when executed by a processor, implement the method for determining the hand position information according to the first aspect.

BRIEF DESCRIPTION OF THE DRAWINGS

In order to illustrate technical solutions of embodiments of the present application more clearly, the drawings required for the embodiments of the present application will be briefly described. For a person skilled in the art, other drawings can also be obtained from these drawings without any inventive effort.

DETAILED DESCRIPTION

Features and exemplary embodiments of various aspects of the present application will be described in detail below. In order to make the objects, technical solutions and advantages of the present application clearer, the present application is further described in detail below with reference to the accompanying drawings and specific embodiments. It should be understood that the specific embodiments described herein are only used to explain the present application, but not to limit the present application. For those skilled in the art, the present application can be implemented without some of these specific details. The following description of the embodiments is only to provide a better understanding of the present application by illustrating examples of the present application.

Human posture estimation mainly studies and describes human posture and predicts behavior of a human body. A recognition process of the human posture estimation is a process in which human movement is recognized according to change in positions of joint points in the human body in a specified image or video. A general human posture estimation model can only recognize position information of key joint points of the human body through deep learning and according to context. However, the model cannot recognize a hand area of the human body. In this regard, based on the human posture estimation model, hand position information of a human object is recognized using a hand skeleton AI model. Although a hand area of the human object can be recognized in some way, problems such as increased recognition algorithm delay and a need for largely increased computing capacity also occur.

In order to achieve rapid recognition of hand position information of the human object in an image, embodiments of the present application provide a method and an apparatus for determining hand position information, a device and a computer storage medium, so that a size of a preset shape surrounding a hand area can be determined using a height difference between a head key part and a first joint point, and position information of feature points of the preset shape can be determined according to position information of the wrist joint point, position information of the elbow joint point and the hand size. As such, the hand position information is determined quickly and easily.

The method for determining the hand position information according to the embodiments of the present application is described below first.

Figure 1:
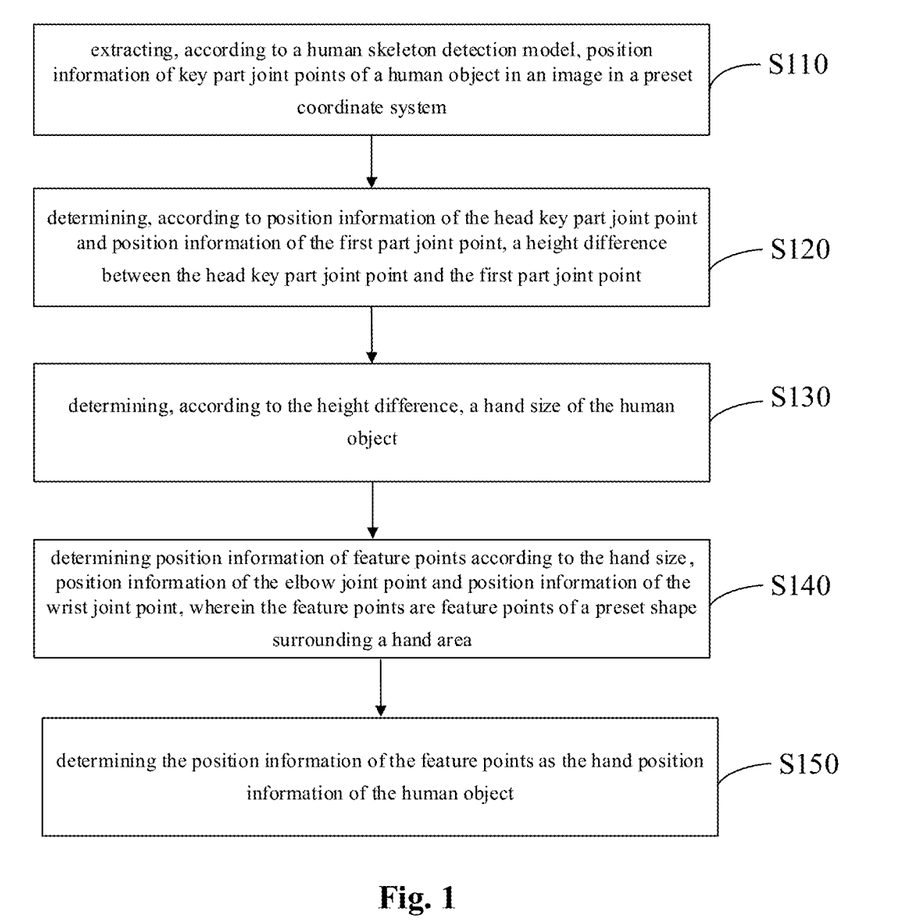
FIG. 1 is a schematic flowchart of an embodiment of a method for determining hand position information according to the present application.

FIG. 1 is a schematic flowchart of an embodiment of a method for determining hand position information according to the present application. As shown in FIG. 1, the method for determining the hand position information is applied to an apparatus for determining hand position information, and includes the following steps S110 to S150.

In step S110, position information of key part joint points of a human object in an image in a preset coordinate system is extracted according to a human skeleton detection model.

Herein, the key part joint points include at least a head key part joint point, a first part joint point, an elbow joint point and a wrist joint point.

In step S120, a height difference between the head key part joint point and the first part joint point is determining according to position information of the head key part joint point and position information of the first part joint point.

In step S130, a hand size of the human object is determined according to the height difference.

In step S140, position information of feature points is determined according to the hand size, position information of the elbow joint point and position information of the wrist joint point.

In step S150, the position information of the feature points is determined as the hand position information of the human object.

In the embodiments of the present application, the height difference between the first part joint point and the head key part joint point can be obtained by acquiring the position information of the key part joint points of the human object in the image, and the hand size of the human object can be obtained according to the height difference. At the same time, position information of the feature points of the preset shape surrounding the hand area is obtained according to the hand size, the position information of the elbow joint point and the position information of the wrist joint point, and the position information of the feature points of the preset shape is determined as the hand position information. As such, the hand position information of the human object in the image may be determined rapidly by calculating the position information of the feature points of the preset shape surrounding the hand, so that the hand position information may be recognized under a condition that complicated calculation is not performed. Accordingly, steps for recognizing the hand position information are simplified, problems such as increased algorithm delay and a need for largely increased computing capacity are avoided.

Specific implementations of the steps are described below.

The "preset coordinate system" related to the embodiments of the present application may be a reference coordinate system of the image. Optionally, the coordinate system of the image may be a rectangular coordinate system. In the reference coordinate system of the image, a first coordinate axis is perpendicular to a second coordinate axis. For example, in the reference coordinate system of the image, a direction of horizontal right may be defined as a positive direction of the first coordinate axis, and a direction of vertical down may be defined as a positive direction of a second coordinate axis. Alternatively, a direction of horizontal left may be defined as a positive direction of the first coordinate axis, and a direction of vertical down may be defined as a positive direction of a second coordinate axis. The directions of the preset coordinate system are not limited in the embodiments of the present application.

The "human skeleton detection model" according to the embodiments of the present application is used for detecting the position information of important joint points of the human object from the image. The human skeleton detection model may be a deep learning model used for the human posture estimation. For example, the human skeleton detection model may be a AlphaPose model, a Pytorch-OpenPose model, a Openpifpaf model, a MobilePose model, a lighttrack model, or a Lightweight OpenPose model.

Figure 2:
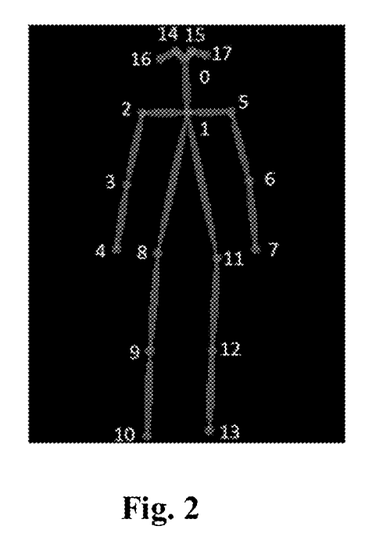
FIG. 2 is a schematic view of key joint points of a human body in an embodiment of a method for determining hand position information according to the present application.

FIG. 2 is a schematic view of key joint points of a human body according to embodiments of the present application. As shown in FIG. 2, the key joint points of the human body may include a nose joint point 0, a neck joint point 1, a left eye joint point 15, a right eye joint point 14, a left ear joint point 17, a right ear joint point 16, a left shoulder joint point 5, a right shoulder joint point 2, a left elbow joint point 6, a right elbow joint point 3, a left wrist joint point 7, a right wrist joint point 4, a left hip joint point 11, a right hip joint point 8, a left knee joint point 12, a right knee joint point 9, a left ankle joint point 13, and a right ankle joint point 10.

Figure 3:
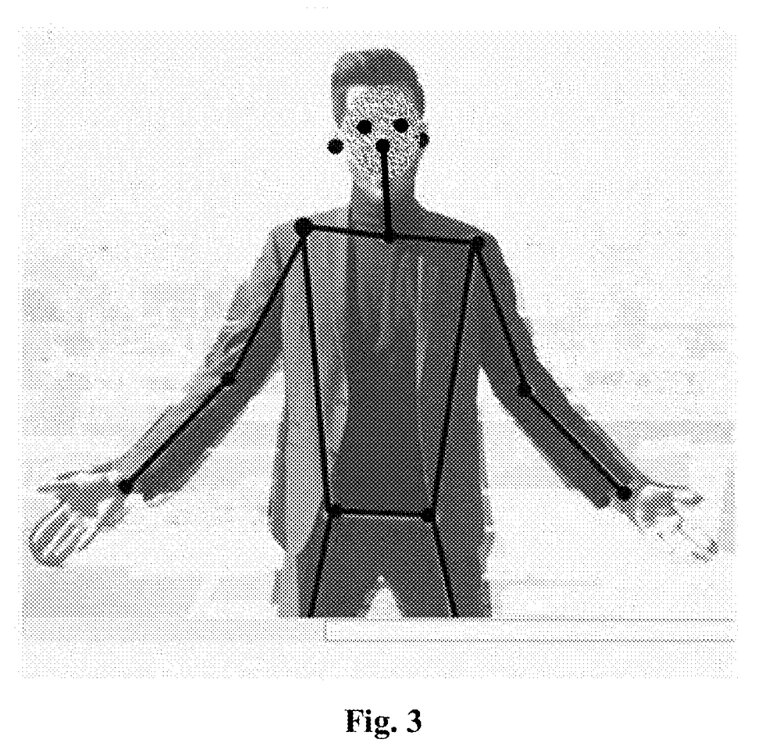
FIG. 3 is a schematic view of an image of a person in an embodiment of a method for determining hand position information according to the present application.

The "image" according to the embodiments of the present application may be an image of a person including at least one human object. FIG. 3 is a schematic view of an image of a person according to embodiments of the present application. As shown in FIG. 3, one human object is included in the drawing. In step S110, the apparatus for determining the hand position information recognizes the human object in the image, and then extracts the key part joint points of the human object using the human skeleton detection model, and determines the position information of the key part joint points of in the preset coordinate system.

The "key part joint points" according to the embodiments of the present application may include at least the head key part joint point, the first part joint point, the elbow joint point and the wrist joint point, in which the first part joint point includes a neck joint point or a shoulder joint point.

A large number of data studies shows that movement ranges of a human head and a human neck are less than movement ranges of four human limbs when people move.

Accordingly, positions on the head joint point and the neck joint point are more stable than joint points on the four human limbs. Optionally, the head joint point may include an ear joint point, a nose joint point and an eye joint point.

The "position information" according to the embodiments of the present application may be position information of a joint point in the preset coordinate system. The position information may include coordinate information. Optionally, under a condition that the image is a two-dimensional image, the coordinate information may include a coordinate on the first coordinate axis and a coordinate on the second coordinate axis. The magnitude of a coordinate on the first coordinate axis is a distance from a coordinate point to the second coordinate axis. The magnitude of a coordinate on the second coordinate axis is a distance from a coordinate point to the first coordinate axis.

The "height difference" according to the embodiments of the present application may be a height difference along a vertical direction in the preset coordinate system. Optionally, the height difference may be a difference between coordinates of the two joint points along the vertical direction.

In step S120, the apparatus for determining the hand position information determines the height difference between the head key joint point and the first part joint point according to a difference between coordinates of the head key part joint point and the first part joint point along the vertical direction.

Under a condition that people move their heads (for example, under a condition that people lift their heads or lower their heads), heights of the eye joint point and the nose joint point relative to the neck joint point change dramatically, a height of the ear joint point relative to the neck joint point changes less dramatically, and under a condition that the human body tilts to a side, a variation in a height difference between the joint points is less than a variation in a width difference between the joint points.

Accordingly, in order to determine the hand size of a person more accurately, in some embodiments, the head key joint point may include the left ear joint point or the right ear joint point, or may include both the left ear joint point and the right ear joint point.

In some embodiments, the first part joint point may include the neck joint point. Whether people are moving or not, a position of the human neck is relatively fixed. Accordingly, a height difference between the head key joint point and the neck joint point is relatively fixed.

In some embodiments, the first part joint point may further include shoulder joints. Since the left shoulder joint point and the right shoulder joint point are almost collinear with the neck joint point, and the neck joint point is almost located between the two shoulder joint points, a height difference between the head key joint point and the shoulder joint point is relatively fixed.

The "hand size" according to the embodiments of the present application may be a size of the preset shape surrounding the hand area. Optionally, the hand size may be a side length, a diameter, a radius or an area.

In some embodiments, there is a proportional relationship between a human joint length and the hand size, therefore, in order to determine the hand size accurately, in step S130, the apparatus for determining the hand position information may multiply the height difference between the head key joint point and the first part joint point by a preset coefficient to obtain the hand size.

Here, a preset coefficient range may be in a range from 0.7 to 1.3. For example, under a condition that the preset shape is a rectangle, the preset coefficient may include a preset coefficient of a wide side and a preset coefficient of a long side. The apparatus for determining the hand position information multiplies the height difference by the preset coefficient of the wide side and the preset coefficient of the long side respectively to obtain a length of the wide side and a length of the long side of the preset shape, in which the length of the wide side is less than the length of the long side. Optionally, the preset coefficient of the wide side may be 0.8 and the preset coefficient of the long side may be 1.2.

The "preset shape" according to the embodiments of the present application may be a geometric shape surrounding the hand area. Optionally, the preset shape may be a circle or a polygon.

The "feature points" according to the embodiments of the present application are feature points of the preset shape surrounding the hand area. The feature points may be feature points of the preset shape, and a position of the preset shape may be determined by the feature points. Optionally, the feature point may be a center point, a vertex, or a dot.

Since the hand is connected to the wrist, the approximate position of the hand area may be roughly determined according to the wrist joint point and the elbow joint point. At the same time, a size of the preset shape may be determined according to the hand size. Accordingly, in step S140, the apparatus for determining the hand position information may determine the position information of the feature points according to the hand size, the position information of the elbow joint point and the position information of the wrist joint point.

In some embodiments, the step S140 may be specifically performed as:

determining, according to the position information of the elbow joint point and the position information of the wrist joint point, a first straight line and a first straight line equation corresponding to the first straight line;

determining a relative position of a hand with respect to the wrist joint point according to the first straight line equation, the position information of the elbow joint point and the position information of the wrist joint point;

determining the position information of the feature points according to the relative position, the hand size and the position information of the wrist joint point.

Here, the first straight line is a straight line formed by connecting the elbow joint point to the wrist joint point. Accordingly, the apparatus for determining the hand position information may determine the first straight line equation according to the position information of the elbow joint point and the position information of the wrist joint point.

The "straight line equation" according to the embodiments of the present application may be in one of the following three forms:

$$y = a, x = b, y = ax + b.$$

Herein, the y may represent a distance from a coordinate point to the first coordinate axis, the x may represent a distance from a coordinate point to the second coordinate axis, the a represents a slope of the straight line, and the b represents an inclination angle of the straight line relative to the first coordinate axis.

The "relative position" according to the embodiments of the present application may include a position facing a side of the positive direction of the first coordinate axis, a position facing a side of a negative direction of the first coordinate axis, a position facing a side of a positive direction of the second coordinate axis, and a position facing a side of a negative direction of the second coordinate axis.

In the embodiments, since the hand, the wrist and the elbow are connected in sequence, the relative position of the hand with respect to the wrist joint point may be determined according to a positional relationship between the elbow joint point and the wrist joint point. The position information of the feature points of the preset shape surrounding the hand area may be determined rapidly and accurately according to a relative positional relationship, the hand size and the position information of the wrist joint point.

In some embodiments, determining the relative position of the hand with respect to the wrist joint point according to the first straight line equation, the position information of the elbow joint point and the position information of the wrist joint point may include:

determining, according to the first straight line equation, a positional relationship between the first straight line and a coordinate axis in the preset coordinate system; and determining the relative position of the hand with respect to the wrist joint point according to the positional relationship and a coordinate relative relationship between the elbow joint point and the wrist joint point.

Here, the coordinate axis may be the first coordinate axis or the second coordinate axis. Under a condition that the first straight line equation is y=a, the apparatus for determining the hand position information may determine that the first straight line is parallel to the first coordinate axis, or perpendicular to the second coordinate axis. Under a condition that the first straight line equation is x=b, the apparatus for determining the hand position information may determine that the first straight line is perpendicular to the first coordinate axis, or parallel to the second coordinate axis. Under a condition that the first straight line equation is y=ax+b, the apparatus for determining the hand position information may determine that the first straight line obliquely intersects the first coordinate axis, or that the first straight line obliquely intersects the second coordinate axis.

The "coordinate relative relationship" according to the embodiments of the present application includes a relative relationship to the first coordinate axis or a relative relationship to the second coordinate axis.

In the embodiments, the relative position of the hand with respect to the wrist joint point may be determined accurately and rapidly according to the positional relationship between the first straight line and the coordinate axis in the preset coordinate system, so as to subsequently select correct feature points from a plurality of candidate feature points.

In some embodiments, determining the relative position of the hand with respect to the wrist joint point according to the positional relationship and the coordinate relative relationship between the elbow joint point and the wrist joint point may include:

determining, under a condition that the first straight line is perpendicular to the first coordinate axis and a coordinate of the wrist joint point on the second coordinate axis is greater than a coordinate of the elbow joint point on the second coordinate axis, that the hand is located at a side of the wrist joint point facing the positive direction of the second coordinate axis.

In some embodiments, determining the relative position of the hand with respect to the wrist joint point according to the positional relationship and the coordinate relative relationship between the elbow joint point and the wrist joint point may include:

determine, under a condition that the first straight line is perpendicular to the first coordinate axis and the coordinate of the elbow joint point on the second coordinate axis is greater than the coordinate of the wrist joint point on the second coordinate axis, that the hand is located at a side of the wrist joint point facing the negative direction of the second coordinate axis.

In some embodiments, determining the relative position of the hand with respect to the wrist joint point according to the positional relationship and the coordinate relative relationship between the elbow joint point and the wrist joint point may include:

determine, under a condition that the first straight line is parallel to or obliquely intersects the first coordinate axis and the coordinate of the wrist joint point on the first coordinate axis is greater than the coordinate of the elbow joint point on the first coordinate axis, that the hand is located at a side of the wrist joint point facing a positive direction of the first coordinate axis.

In some embodiments, determining the relative position of the hand with respect to the wrist joint point according to the positional relationship and the coordinate relative relationship between the elbow joint point and the wrist joint point may include:

determine, under a condition that the first straight line is parallel to or obliquely intersects the first coordinate axis and the coordinate of the elbow joint point on the first coordinate axis is greater than the coordinate of the wrist joint point on the first coordinate axis, that the hand is located at a side of the wrist joint point facing a negative direction of the first coordinate axis.

In order to further deepen the understanding of the relative position of the hand with respect to the wrist joint point, an example is given in which the first coordinate axis is an abscissa axis, a direction along the horizontal right is a positive direction, a direction along the horizontal left is a negative direction, and a second coordinate axis is an ordinate axis, a direction along the vertical downward is a positive direction, a direction along the vertical upward is a negative direction, position information of an elbow joint point A may be $(x_3, y_2)$, and position information of a wrist joint point B may be $(x_1, y_1)$.

Figure 4:
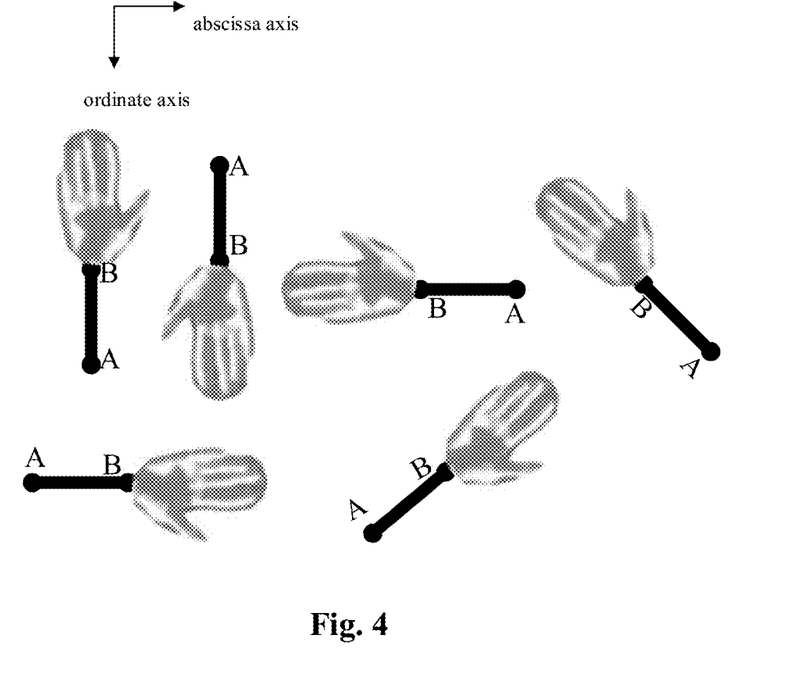
FIG. 4 is a schematic view of a relative position of a hand with respect to a wrist joint point in an embodiment of a method for determining hand position information according to the present application.

FIG. 4 is a schematic view of a relative position of a hand with respect to a wrist joint point according to embodiments of the present application. As shown in FIG. 4, under a condition that the first straight line is perpendicular to the abscissa axis and $y_2>y_1$, the elbow joint point is located below the wrist joint point, and the hand is located above the wrist joint point B. Under a condition that the first straight line is perpendicular to the abscissa axis and $y_2<y_1$, the elbow joint point A is located above the wrist joint point, and the hand is located below the wrist joint point.

Under a condition that the first straight line is parallel to or obliquely intersects the first coordinate axis and $x_2>x_1$, the elbow joint point A is located at the right of the wrist joint point B, and the hand is located at the left of the wrist joint point B. Under a condition that the first straight line is parallel to or obliquely intersects the first coordinate axis and $x_2<x_1$, the elbow joint point A is located at the left of the wrist joint point B, and the hand is located at the right of the wrist joint point B.

In the embodiment, the relative position of the hand with respect to the wrist joint point is determined accurately according to the magnitude of the coordinates of the wrist joint point and the elbow joint point and the positional relationship between the first straight line and the first coordinate axis.

The "first distance" according to the embodiments of the present application may be determined according to the hand size. For example, the first distance may be equal to a half of the hand size, or a difference between the first distance and a half of the hand size is within a preset range. Optionally, the preset range may be about 3 cm.

In some embodiments, under a condition that the preset shape may be a circle, the circle is symmetrical with respect the first straight line, and the radius of the circle is the first distance. In addition, the circle passes through the wrist joint point, and is away from the elbow joint point.

In some embodiments, under a condition that the preset shape is the circle, determining the position information of the feature points according to the relative position, the hand size and the position information of the wrist joint point may include:

determining, on the first straight line, a first coordinate point with a first distance from the wrist joint point;
determining, according to the relative position and the first coordinate point, the position information of the feature points.

Here, the feature point of the preset shape may be the center of the circle. The center of the circle is located on the first straight line, and a distance between the center of the circle and the wrist joint point is the first distance. Since there are on the first straight line two first coordinate points with a first distance from the wrist joint point, the apparatus for determining the hand position information may determine that which one of the first coordinate points is used as the feature point according to the relative position of the hand with respect to the wrist joint point. Further, the radius of the preset shape is the first distance.

Figure 5:
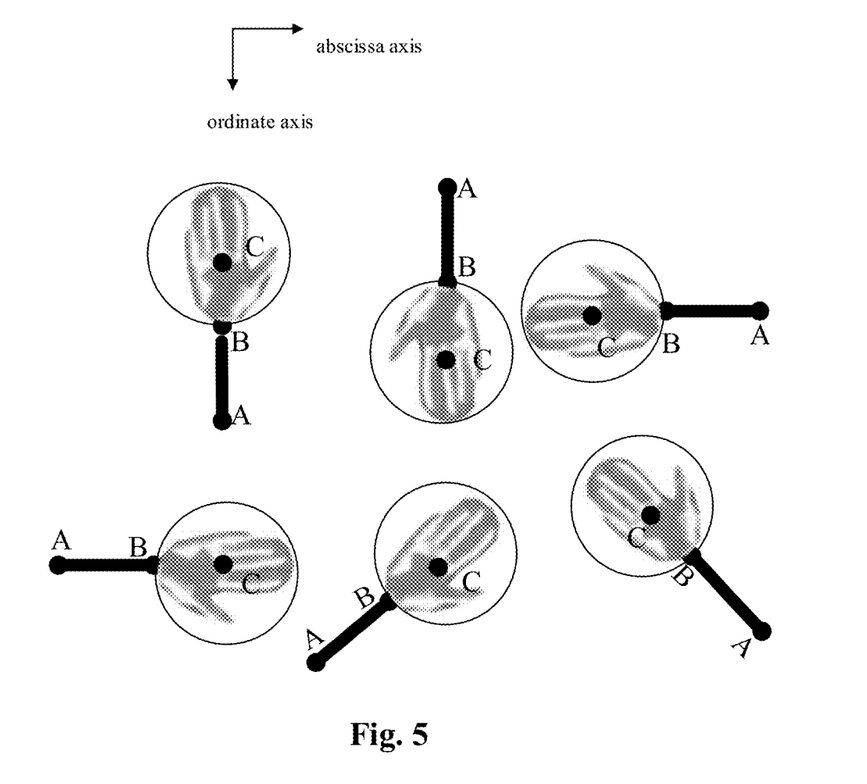
FIG. 5 is a schematic view of hand position information in an embodiment of a method for determining hand position information according to the present application.

FIG. 5 is a schematic view of hand position information according to embodiments of the present application. As shown in FIG. 5, the first coordinate axis is the abscissa axis, the direction along the horizontal right is the positive direction, the second coordinate axis is the ordinate axis, the direction along the vertical downward is the positive direction, a first distance is L, and the position information of the wrist joint point B may be $(x_1, y_1)$. The position information of the first coordinate point is $(x_3, y_3)$ and $(x_4, y_4)$.

Under a condition that the first straight line equation is $x=a_1$, $x_3=x_1$, $y_3=y_1+L$, $x_4=x_1$, $y_4=y_1-L$. Under a condition that the hand is located above the wrist joint point, position information of the feature point C is $(x_4, y_4)$. Under a condition that the hand is located below the wrist joint point B, the position information of the feature point C is $(x_3, y_3)$.

Under a condition that the first straight line equation is $y=b_1$, $x_3=x_1+L$, $y_3=b_1$, $x_4=x_1-L$, and $y_4=b_1$. Under a condition that the hand is located at the left of the wrist joint point B, the position information of the feature point C is $(x_4, y_4)$. Under a condition that the hand is located at the right of the wrist joint point B, the position information of the feature point C is $(x_3, y_3)$.

Under a condition that the first straight line equation is $y=a_1x+b_1$, $d_1=\text{sqrt}(L^2/(1+a_1^2))$, in which the sqrt represents a square root operation. $x_3=x_1+d_1$, $y_3=a_1x_3+b_1$, $x_4=x_1-d_1$, and $y_4=a_1x_4+b_1$. Under a condition that the hand is located at the right of the wrist joint point B, the position information of the feature point is $(x_3, y_3)$. Under a condition that the hand is located at the left of the wrist joint point B, the position information of the feature point is $(x_4, y_4)$.

It should be noted that the preset shape may be a circle having the feature point as the center of the circle and the first distance as the radius.

In addition, under a condition that the feature point is a point where the first straight line intersects the preset shape, a distance between the feature point and the wrist joint point is the first distance. Accordingly, the preset shape may be a circle having a center point between the feature point and the wrist joint point as the center of the circle and 2 times of the first distance as a diameter. Embodiments of a process for calculating the feature points is similar to the embodiments, and are not repeated here.

It should be noted that the preset shape may also be an ellipse. The circle as the preset shape is not limited in the embodiments of the present application.

In the embodiments, under a condition that the preset shape is a circle, the position information of the feature point of the circle is obtained according to the first straight line and the first distance, so that the hand position information may be determined rapidly and accurately.

The "polygon" according to the embodiments of the present application may be a triangle, a quadrangle, a pentagon, and the like, and the center line of the polygon is on the first straight line. Under a condition that the preset shape may be a polygon, the feature points of the preset shape may be vertices of the polygon or the center point of the polygon.

In some embodiments, under a condition that the preset shape is the polygon, determining the position information of the feature points according to the relative position, the hand size and the position information of the wrist joint point includes:
- determining, under a condition that the feature points include vertices of the preset shape, a slope of a second straight line perpendicular to the first straight line according to the first straight line equation;
- determining, according to the position information of the wrist joint point and the slope of the second straight line, the second straight line and a second straight line equation corresponding to the second straight line;
- calculating, according to the second straight line equation and the position information of the wrist joint point, positions of vertices of a first side of the polygon;
- determining positions of vertices of sides of the preset shape other than the first side according to the vertices of the first side, the relative position, inner angles of the polygon and the first distance.

Here, the second straight line is perpendicular to the first straight line, and the second straight line passes through the wrist joint point. As such, the slope of the second straight line may be obtained according to the slope in the first straight line equation, and a straight line equation corresponding to the second straight line may be obtained according to the position information of the wrist joint point.

The "first side" according to the embodiments of the present application is a side of the preset shape passing through the wrist joint point. The first side is located on the second straight line. The vertices of the first side includes a first vertex and a second vertex. A distance between the first vertex and the wrist joint point is a first distance, and a distance between the second vertex and the wrist joint point is also a first distance. As such, position information of two vertices of the first side of the preset shape may be obtained according to the slope of the first straight line, the position information of the wrist joint point, and the first distance.

Here, a slope of the second side may be obtained according to a slope of the first side and the inner angles of the polygon by the apparatus for determining the hand position information. A slope of the third side may obtained according to the slope of the second side and the inner angles of the polygon. Therefore, a slope of each side of the preset shape may be obtained in the same manner. Straight line equations corresponding to straight lines of sides may be obtained according to the slope of each side and the known vertices of each side. A variation of one vertex of a side along the coordinate axis with respect to the other vertex is obtained according to a length of a side of the preset shape and a slope of each side, and vertices of each side are determined according to relative position information and a straight line equation of a side.

The "first distance" in the embodiments of the present application may be a half of a length of a side. The first distance may be determined according to the hand size. In addition, the hand size may include a size of the wide side and a size of the long side, and the first distance may include a long side distance and a short side distance. A difference between the distance to the long side and a half of the size of the long side may be within a preset threshold, and a difference between the distance to the short side and a half of a size of the short side may be within a preset threshold.

Figure 6:
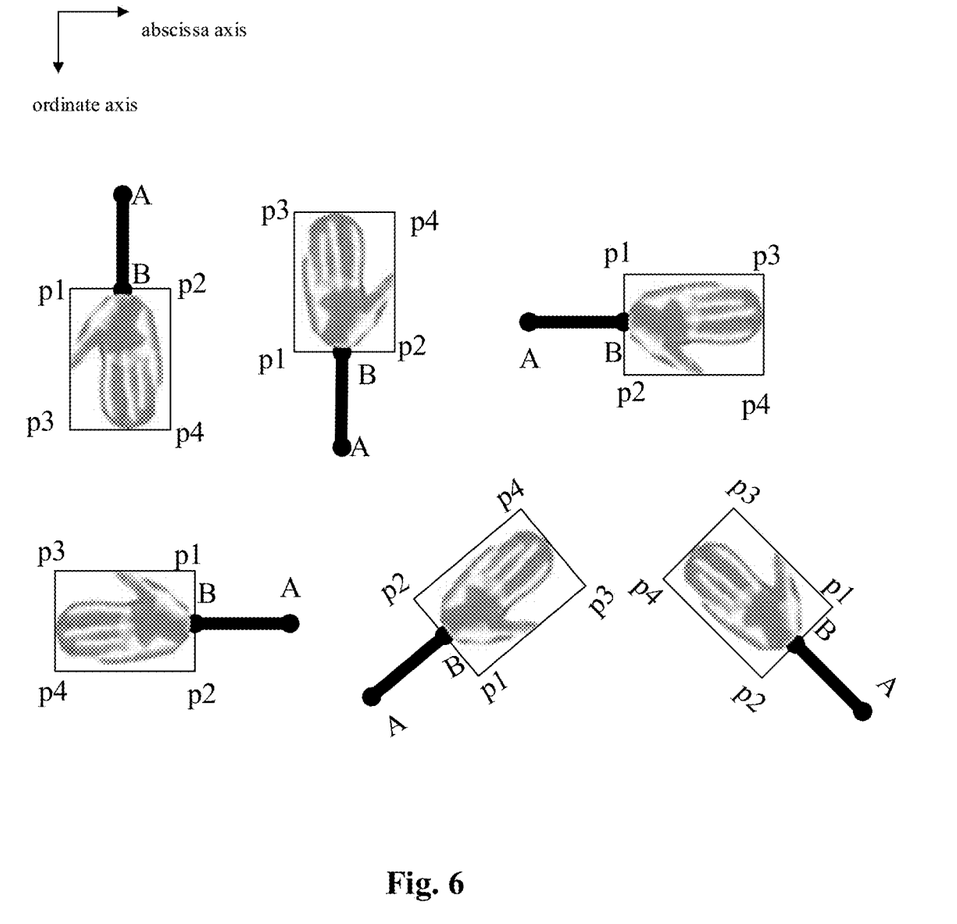
FIG. 6 is another schematic view of hand position information in an embodiment of a method for determining hand position information according to the present application.

FIG. 6 is another schematic view of hand position information according to embodiments of the present application. As shown in FIG. 6, the preset shape is a rectangle, in which the length of the long side of the rectangle is 2 times of the distance to the long side and is represented by w, and a length of the short side of the rectangle is 2 times of the distance to the short side and is represented by h. The first coordinate axis is the abscissa axis, the direction along the horizontal right is the positive direction, the second coordinate axis is the ordinate axis, the direction along the vertical downward is the positive direction, position information of the wrist joint point B is $(x_1, y_1)$, and the first straight line is $l_1$.

Under a condition that an equation of the straight line $l_1$ is $x=a_1$, two vertices of the first side of the rectangle are $p_1$ $(x_1-w/2, y_1)$ and $p_2$ $(x_1+w/2, y_1)$, respectively. Under a condition that the hand is located below the wrist joint point, two vertices of another side of the rectangle are $p_3$ $(x_1-w/2, y_1+h)$ and $p_4$ $(x_1+w/2, y_1+h)$, respectively. Under a condition that the hand is located above the wrist joint point, two vertices of another side of the rectangle are $p_3$ $(x_1-w/2, y_1-h)$ and $p_4$ $(x_1+w/2, y_1-h)$, respectively.

Under a condition that an equation of the straight line $l_1$ is $x=a_1$, two vertices of the first side of the rectangle are $p_1$ $(x_1, y_1-w/2)$ and $p_2$ $(x_1, y_1+w/2)$, respectively. Under a condition that the hand is located at the right of the wrist joint point, two vertices of another side of the rectangle are $p_3$ $(x_1+h, y_1-w/2)$ and $p_4$ $(x_1+h, y_1+w/2)$, respectively. Under a condition that the hand is located at the left of the wrist joint point, two vertices of another side of the rectangle are $p_3$ $(x_1-h, y_1-w/2)$ and $p_4$ $(x_1-h, y_1+w/2)$, respectively.

Under a condition that the first straight line $l_1$ is $y=a_1x+b_1$, a second straight line $l_2$ perpendicular to $l_1$ and passing through the wrist joint point is obtained firstly. The second straight line $l_2$ is $y=a_2x+b_2$, in which $a_2=-1/a_1$, and $b_2=y_1-a_2x_1$.

Secondly, two vertices $p_1$ $(x_5, y_5)$ and $p_2$ $(x_6, y_6)$ on $l_2$ each of which has a distance of w/2 from the wrist joint point (that is, the two vertices of the first side) are calculated. Specifically, a length that varies along the abscissa axis is $d_2=\text{sqrt}((w/2)^2/(1+a_2^2))$, in which the sqrt represents the square root operation. Here, $x_5=x_1+d_2$, $y_5=a_2x_1+b_2$, $x_6=x_1-d_2$, and $y_6=a_2x_6+b_2$.

Thirdly, a third straight line $l_3$ perpendicular to the second straight line $l_2$ (that is, the inner angle is 90 degrees) and passing through p1 and a fourth straight line $l_4$ perpendicular to the second straight line $l_2$ and passing through p2 are calculated.

The third straight line $l_3$ may be $y=a_1x+b_3$, in which $b_3=y_5-a_1x_5$.

The fourth straight line $l_4$ may be $y=a_1x+b_4$, in which $b_4=y_6-a_1x_6$.

A length that varies along the ordinate axis is $d_3=\text{sqrt}((h)^2/(1+a_1^2))$.

Finally, two vertices of another side of the rectangle are $p_3$ $(x_7, y_7)$ and $p_4$ $(x_8, y_8)$, respectively, and under a condition that the hand is located at the right of the wrist joint point, $x_7=x_5+d_3$, $y_7=a_1x_7+b_3$, $x_8=x_4+d_3$, and $y_8=a_1x_8+b_4$.

Under a condition that the hand is located at the left of the wrist joint point, $x_7=x_5-d_3$, $y_7=a_1x_7+b_8$, $x_8=x_4-d_3$, $y_8=a_1x_8+b_4$.

In the embodiments, under a condition that the preset shape is a polygon, the two vertices of the first side passing through the wrist joint point are obtained firstly according to the second straight line perpendicular to the first straight line, and then vertices of other sides of the polygon are obtained according to inner angles of the polygon and the first distance, so that the hand position information can be determined rapidly using a simple geometric operation.

Accordingly, based on the method for determining the human hand position information according to the embodiments, the present application further provides a specific implementation of the apparatus for determining the hand position information. Reference is made to examples below.

Figure 7:
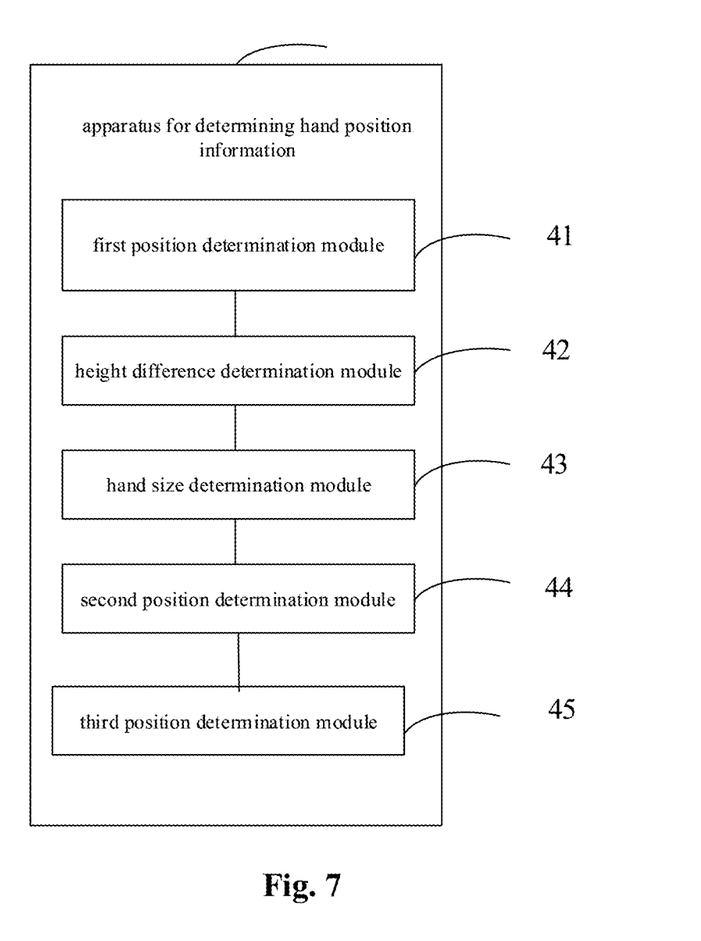
FIG. 7 is a schematic structural view of an embodiment of an apparatus for determining hand position information according to the present application.

FIG. 7 is a schematic structural view of an embodiment of an apparatus for determining hand position information according to the present application. As shown in FIG. 7, the apparatus for determining the hand position information according to the embodiments of the present application includes the following modules:

a first position determination module 41 configured to determine, according to a human skeleton detection model, position information of key part joint points of a human object in an image in a preset coordinate system, in which the key part joint points include at least a head key part joint point, a first part joint point, an elbow joint point and a wrist joint point, and the first part joint point includes a neck joint point or a shoulder joint point;

a height difference determination module 42 configured to determine, according to position information of the head key part joint point and position information of the first part joint point, a height difference between the head key part joint point and the first part joint point;

a hand size determination module 43 configured to determine, according to the height difference, a hand size of the human object;

a second position determination module 44 configured to determine position information of feature points according to the hand size, position information of the elbow joint point and position information of the wrist joint point, in which the feature points are feature points of a preset shape surrounding a hand area of the human object; and a third position determination module 45 configured to determine the position information of the feature points as the hand position information of the human object.

In some embodiments, the second position determination module 44 includes:

a first straight line determination submodule configured to determine, according to the position information of the elbow joint point and the position information of the wrist joint point, a first straight line and a first straight line equation corresponding to the first straight line;

a relative position determination submodule configured to determine a relative position of a hand of the human object with respect to the wrist joint point according to the first straight line equation, the position information of the elbow joint point and the position information of the wrist joint point; and a feature point position determination submodule configured to determine the position information of the feature points according to the relative position, the hand size and the position information of the wrist joint point.

In some embodiments, the relative position determination submodule includes:

a first positional relationship determination unit configured to determine, according to the first straight line equation, a positional relationship between the first straight line and a coordinate axis in the preset coordinate system; and a relative position determination unit configured to determine the relative position of the hand with respect to the wrist joint point according to the positional relationship and a coordinate relative relationship between the elbow joint point and the wrist joint point.

In some embodiments, the first positional relationship determination unit is configured to: determine, under a condition that the first straight line is perpendicular to a first coordinate axis and a coordinate of the wrist joint point on a second coordinate axis of the preset coordinate system is greater than a coordinate of the elbow joint point on the second coordinate axis, that the hand is located at a side of the wrist joint point facing a positive direction of a second coordinate axis;

determine, under a condition that the first straight line is perpendicular to the first coordinate axis and a coordinate of the elbow joint point on the second coordinate axis is greater than a coordinate of the wrist joint point on the second coordinate axis, that the hand is located at a side of the wrist joint point facing a negative direction of the second coordinate axis;

determine, under a condition that the first straight line is parallel to or obliquely intersects the first coordinate axis and the coordinate of the wrist joint point on the first coordinate axis is greater than the coordinate of the elbow joint point on the first coordinate axis, that the hand is located at a side of the wrist joint point facing a positive direction of the first coordinate axis; and determine, under a condition that the first straight line is parallel to or obliquely intersects the first coordinate axis and the coordinate of the elbow joint point on the first coordinate axis is greater than the coordinate of the wrist joint point on the first coordinate axis, that the hand is located at a side of the wrist joint point facing a negative direction of the first coordinate axis.

In some embodiments, under a condition that the preset shape is a circle, the feature point position determination submodule is configured to: determine, on the first straight line, a first coordinate point with a first distance from the wrist joint point, wherein the first distance is determined according to the hand size; and determine, according to the relative position and the first coordinate point, the position information of the feature points.

In some embodiments, under a condition that the preset shape is a polygon, the feature point position determination submodule is configured to: determine, under a condition that the feature points include vertices of the preset shape, a slope of a second straight line perpendicular to the first straight line according to the first straight line equation;

determine, according to the position information of the wrist joint point and the slope of the second straight line, the second straight line and a second straight line equation corresponding to the second straight line, wherein the second straight line passes through the wrist joint point;

calculate, according to the second straight line equation and the position information of the wrist joint point, positions of vertices of a first side of the polygon, wherein the vertices of the first side include a first vertex and a second vertex, a distance between the first vertex and the wrist joint point and a distance between the second vertex and the wrist joint point are not less than a first distance, and the first distance is determined according to the hand size; and determine positions of vertices of sides of the preset shape other than the first side according to the vertices of the first side, the relative position, inner angles of the polygon and the hand size.

In some embodiments, the head key part joint point includes a left ear joint point and/or a right ear joint point.

Figure 8:
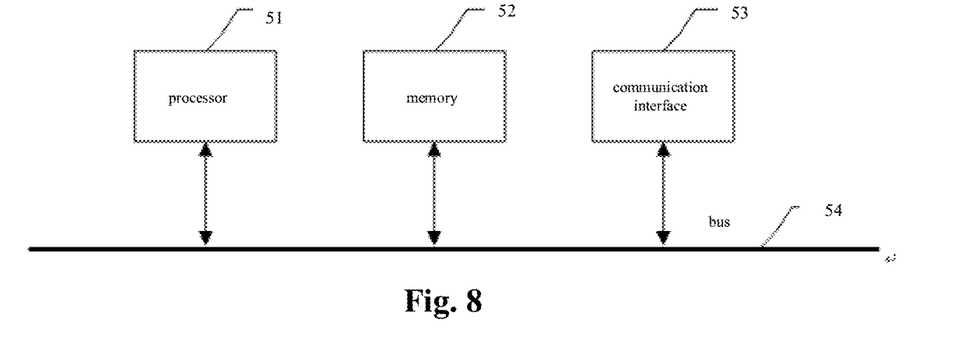
FIG. 8 is a schematic structural view of hardware of an embodiment of an electronic device according to the present application.

FIG. 8 is a schematic structural view of hardware of an embodiment of an electronic device according to the present application.

The electronic device may a processor 51 and a memory 52 storing computer program instructions.

Specifically, the processor 51 may include a central processing unit (CPU), or an application specific integrated circuit (ASIC), or one or more integrated circuit(s) configured to implement the embodiments of the present application.

The memory 52 may include a mass memory for storing data or instructions. As an example but not as a limitation, the memory 52 may include a hard disk drive (HDD), a floppy disk drive, a flash memory, an optical disk, a magneto-optical disk, a magnetic tape, or a universal serial bus (USB) drive or any combination of two or more of them. When appropriate, the memory 52 may include a removable or non-removable (or fixed) medium. When appropriate, the memory 52 may be disposed inside or outside of a comprehensive gateway disaster recovery device. In a certain embodiment, the memory 52 may be a non-volatile solid state memory.

The memory 52 may include a read only memory (ROM), a random access memory (RAM), a magnetic disk storage media device, an optical storage media device, a flash memory device, an electrical, optical or other physical/tangible memory storage device. Thus, the memory generally includes one or more tangible (non-transitory) computer-readable storage media (for example, memory devices) encoded with software which includes computer-executable instructions, the software, when executed (for example, by one or more processors), is operable to perform the operations described with reference to the methods according to an aspect of the present application.

The processor 51 reads and executes the computer program instructions stored in the memory 52 to implement any of methods in the above embodiments.

In one example, the electronic device may further include a communication interface 53 and a bus 54. As shown in FIG. 8, the processor 51, the memory 52, and the communication interface 53 are connected through the bus 54 and achieve mutual communication with each other.

The communication interface 53 is mainly configured to achieve communication between the modules, apparatuses, units and/or devices in the embodiments of the present application.

The bus 54 includes hardware, software, or both of them, and is configured to couple components of the electronic device to each other. As an example but not as a limitation, the bus may include an Accelerated Graphics Port (AGP) or other graphics bus, an Enhanced Industry Standard Architecture (EISA) bus, a Front Side Bus (FSB), a HyperTransport (HT) interconnect, an Industry Standard Architecture (ISA) bus, an Infiniband interconnect, a Low Pin Count (LPC) bus, a memory bus, an Microchannel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus or any other suitable bus or a combination of two or more of them. When appropriate, the bus 54 may include one or more buses. Although the embodiments of the present application describe and illustrate a particular bus, any suitable bus or interconnect is also anticipated in the present application.

The electronic device may be based on performing the method in the embodiments of the present application to implement the method and the apparatus for determining the hand position information described with respect to FIG. 1 to 7.

In addition, the embodiments of the present application may provide a computer storage medium for implementing the method for determining the hand position information in the embodiments. The computer storage medium stores computer program instructions thereon, the computer program instructions, when executed by the processor, perform any of the methods for determining the hand position information in the embodiments. Examples of the computer storage medium include a non-transitory computer readable storage media such as a portable disk, a hard disk, a random access memory (RAM), a read-only memory (ROM), an erasable programmable read-only memory (EPROM or flash), a portable compact disk read-only memory (CD-ROM), an optical storage device, a magnetic storage device, and the like.

In addition, the embodiments of the present application provide a computer program product including computer programs or instructions for implementing the method for positioning the vehicle, and the computer programs or instructions, when executed by a processor, implement any of the methods for determining the hand position information in the embodiments. As an example, the computer program product may be stored in a machine-readable medium or transmitted over a transmission medium or a communication link through a data signal carried in a carrier wave. A "machine-readable medium" may include any medium that can store or transmit information. An example of the machine-readable media includes non-transitory storage media such as an electronic circuit, a semiconductor memory device, a ROM, a flash memory, an erasable ROM (EROM), a random access memory (RAM), a floppy disk, a CD-ROM, an optical disk, a hard disk and the like. The code segments may be downloaded via a computer network such as the Internet, intranet, and the like.

It should be noted that, the present application is not limited to the specific configuration and processing described above and shown in the drawings. For the sake of brevity, a detailed description of the known method is omitted here. In the embodiments, several specific steps are described and shown as examples. However, the method process of the present application is not limited to the specific steps described and shown, and those skilled in the art can make various changes, modifications and additions, or change the sequence of steps after comprehending the gist of the present application.

The functional blocks shown in the structural block diagrams may be implemented as hardware, software, firmware, or a combination thereof. When implemented as hardware, it may be, for example, an electronic circuit, an application specific integrated circuit (ASIC), suitable firmware, a plug-in, a functional card, and the like. When implemented as software, elements of the present application are programs or code segments used to perform required tasks. The programs or code segments may be stored in a machine-readable medium, or transmitted on a transmission medium or a communication link through a data signal carried in a carrier wave. A "machine-readable medium" may include any medium that can store or transmit information. An example of the machine-readable media includes an electronic circuit, a semiconductor memory device, a ROM, a flash memory, an erasable ROM (EROM), a random access memory (RAM), a floppy disk, a CD-ROM, an optical disk, a hard disk, a fiber optic medium, a radio frequency (RF) link, and the like. The code segments may be downloaded via a computer network such as the Internet, intranet, and the like.

It should also be noted that, according to the exemplary embodiments described in the present application, some methods or systems are described based on a series of steps or apparatuses. However, the present application is not limited to the order of the steps, that is, the steps may be executed in the order described in the embodiments or in orders different from that in the embodiments, or several steps may be executed at the same time.

Aspects of the present application are described above with reference to flowchart illustrations and/or block diagrams of methods, vehicle-mounted terminals, electronic devices and computer program products according to the embodiments of the present application. It should be understood that the each block of flowchart illustrations and/or the block diagrams, and a combination of various blocks of the flowchart illustrations and/or the block diagrams may be implemented by the computer program instructions. These computer program instructions may be provided to a processor of a general purpose computer, special purpose computer, or other programmable data processing apparatuses to produce a machine such that execution of the instructions via the processor of the computer or other programmable data processing apparatuses enables the implementation of the functions/actions specified in one or more blocks of the flowchart illustrations and/or block diagrams. Such processor may be but is not limited to a general purpose processor, a special purpose processor, an application specific processor, or a field programmable logic circuit. It should also be understood that each block of the block diagrams and/or the flowchart illustrations, and the combination of blocks of the block diagrams and/or the flowchart illustrations may also be implemented by special purpose hardware that performs specified functions or actions, or by the combination of the special purpose hardware and computer instructions.

The above are only specific implementations of the present application, those skilled in the art may clearly understand that the specific working processes of the above systems, modules and units may be referred to the corresponding processes in the foregoing method embodiments, which is not repeated here for the convenience and brevity of the description. It should be understood that the protection scope of the present application is not limited to this, and any person skilled in the art can easily think of various equivalent modifications or replacements within the technical scope disclosed in the present application, and these modifications or replacements should all be covered within the scope of protection of the present application.

What is claimed is:

1. A method for determining hand position information, comprising:
   determining, according to a human skeleton detection model, position information of key part joint points of a human object in an image in a preset coordinate system, wherein the key part joint points comprise at least a head key part joint point, a first part joint point, an elbow joint point and a wrist joint point, and the first part joint point comprises a neck joint point or a shoulder joint point;
   determining, according to position information of the head key part joint point and position information of the first part joint point, a height difference between the head key part joint point and the first part joint point;
   determining, according to the height difference, a hand size of the human object;
   determining position information of feature points according to the hand size, position information of the elbow joint point and position information of the wrist joint point, wherein the feature points are feature points of a preset shape surrounding a hand area of the human object; and
   determining the position information of the feature points as the hand position information of the human object.

2. The method according to claim 1, wherein determining the position information of the feature points according to the hand size, the position information of the elbow joint point and the position information of the wrist joint point comprises:
   determining, according to the position information of the elbow joint point and the position information of the wrist joint point, a first straight line and a first straight line equation corresponding to the first straight line;
   determining a relative position of a hand of the human object with respect to the wrist joint point according to the first straight line equation, the position information of the elbow joint point and the position information of the wrist joint point; and
   determining the position information of the feature points according to the relative position, the hand size and the position information of the wrist joint point.

3. The method according to claim 2, wherein the preset shape is a circle, and determining the position information of the feature points according to the relative position, the hand size and the position information of the wrist joint point comprises:
   determining, on the first straight line, a first coordinate point with a first distance from the wrist joint point, wherein the first distance is determined according to the hand size; and
   determining, according to the relative position and the first coordinate point, the position information of the feature points.

4. The method according to claim 2, wherein the preset shape is a polygon, and determining the position information of the feature points according to the relative position, the hand size and the position information of the wrist joint point comprises:
   determining, under a condition that the feature points comprise vertices of the preset shape, a slope of a second straight line perpendicular to the first straight line according to the first straight line equation;
   determining, according to the position information of the wrist joint point and the slope of the second straight line, the second straight line and a second straight line equation corresponding to the second straight line, wherein the second straight line passes through the wrist joint point;
   calculating, according to the second straight line equation and the position information of the wrist joint point, positions of vertices of a first side of the polygon, wherein the vertices of the first side comprise a first vertex and a second vertex, a distance between the first vertex and the wrist joint point and a distance between the second vertex and the wrist joint point are not less than a first distance, and the first distance is determined according to the hand size; and
   determining positions of vertices of sides of the preset shape other than the first side according to the vertices of the first side, the relative position, inner angles of the polygon and the hand size.

5. The method according to claim 2, wherein determining the relative position of the hand of the human object with respect to the wrist joint point according to the first straight line equation, the position information of the elbow joint point and the position information of the wrist joint point comprises:

determining, according to the first straight line equation, a positional relationship between the first straight line and a coordinate axis in the preset coordinate system; and     determining the relative position of the hand with respect to the wrist joint point according to the positional relationship and a coordinate relative relationship between the elbow joint point and the wrist joint point.

6. The method according to claim 5, wherein determining the relative position of the hand with respect to the wrist joint point according to the positional relationship and the coordinate relative relationship between the elbow joint point and the wrist joint point comprises:

determining, under a condition that the first straight line is perpendicular to a first coordinate axis and a coordinate of the wrist joint point on a second coordinate axis of the preset coordinate system is greater than a coordinate of the elbow joint point on the second coordinate axis, that the hand is located at a side of the wrist joint point facing a positive direction of the second coordinate axis;

determining, under a condition that the first straight line is perpendicular to the first coordinate axis and the coordinate of the elbow joint point on the second coordinate axis is greater than the coordinate of the wrist joint point on the second coordinate axis, that the hand is located at a side of the wrist joint point facing a negative direction of the second coordinate axis;

determining, under a condition that the first straight line is parallel to or obliquely intersects the first coordinate axis and the coordinate of the wrist joint point on the first coordinate axis is greater than the coordinate of the elbow joint point on the first coordinate axis, that the hand is located at a side of the wrist joint point facing a positive direction of the first coordinate axis; and     determining, under a condition that the first straight line is parallel to or obliquely intersects the first coordinate axis and the coordinate of the elbow joint point on the first coordinate axis is greater than the coordinate of the wrist joint point on the first coordinate axis, that the hand is located at a side of the wrist joint point facing a negative direction of the first coordinate axis.

7. The method according to claim 1, wherein the head key part joint point comprises a left ear joint point and/or a right ear joint point.

8. A non-transitory computer storage medium having computer program instructions stored thereon, wherein the computer program instructions, when executed by a processor, implement the method for determining the hand position information according to claim 1.

9. A non-transitory computer program product comprising computer programs or instructions, wherein the computer programs or instructions, when executed by a processor, implement the method for determining the hand position information according to claim 1.

10. An electronic device comprising a processor and a memory storing computer program instructions;

wherein the computer program instructions, when executed by the processor, implement operations comprising:

determining, according to a human skeleton detection model, position information of key part joint points of a human object in an image in a preset coordinate system, wherein the key part joint points comprise at least a head key part joint point, a first part joint point, an elbow joint point and a wrist joint point, and the first part joint point comprises a neck joint point or a shoulder joint point;

determining, according to position information of the head key part joint point and position information of the first part joint point, a height difference between the head key part joint point and the first part joint point;

determining, according to the height difference, a hand size of the human object;

determining position information of feature points according to the hand size, position information of the elbow joint point and position information of the wrist joint point, wherein the feature points are feature points of a preset shape surrounding a hand area of the human object; and     determining the position information of the feature points as the hand position information of the human object.

11. The electronic device according to claim 10, wherein the head key part joint point comprises a left ear joint point and/or a right ear joint point.

12. The electronic device according to claim 10, wherein determining the position information of the feature points according to the hand size, the position information of the elbow joint point and the position information of the wrist joint point comprises:

determining, according to the position information of the elbow joint point and the position information of the wrist joint point, a first straight line and a first straight line equation corresponding to the first straight line;

determining a relative position of a hand of the human object with respect to the wrist joint point according to the first straight line equation, the position information of the elbow joint point and the position information of the wrist joint point; and     determining the position information of the feature points according to the relative position, the hand size and the position information of the wrist joint point.

13. The electronic device according to claim 12, wherein the preset shape is a circle, and determining the position information of the feature points according to the relative position, the hand size and the position information of the wrist joint point comprises:

determining, on the first straight line, a first coordinate point with a first distance from the wrist joint point, wherein the first distance is determined according to the hand size; and     determining, according to the relative position and the first coordinate point, the position information of the feature points.

14. The electronic device according to claim 12, wherein the preset shape is a polygon, and determining the position information of the feature points according to the relative position, the hand size and the position information of the wrist joint point comprises:

determining, under a condition that the feature points comprise vertices of the preset shape a slope of a second straight line perpendicular to the first straight line according to the first straight line equation,;

determining, according to the position information of the wrist joint point and the slope of the second straight line, the second straight line and a second straight line equation corresponding to the second straight line, wherein the second straight line passes through the wrist joint point;

calculating, according to the second straight line equation and the position information of the wrist joint point, positions of vertices of a first side of the polygon, wherein the vertices of the first side comprise a first vertex and a second vertex, a distance between the first vertex and the wrist joint point and a distance between the second vertex and the wrist joint point are not less than a first distance, and the first distance is determined according to the hand size; and determining positions of vertices of sides of the preset shape other than the first side according to the vertices of the first side, the relative position, inner angles of the polygon and the hand size.

15. The electronic device according to claim 12, wherein determining the relative position of the hand of the human object with respect to the wrist joint point according to the first straight line equation, the position information of the elbow joint point and the position information of the wrist joint point comprises:

determining, according to the first straight line equation, a positional relationship between the first straight line and a coordinate axis in the preset coordinate system; and determining the relative position of the hand with respect to the wrist joint point according to the positional relationship and a coordinate relative relationship between the elbow joint point and the wrist joint point.

16. The electronic device according to claim 15, wherein determining the relative position of the hand with respect to the wrist joint point according to the positional relationship and the coordinate relative relationship between the elbow joint point and the wrist joint point comprises:

determining, under a condition that the first straight line is perpendicular to a first coordinate axis and a coordinate of the wrist joint point on a second coordinate axis of the preset coordinate system is greater than a coordinate of the elbow joint point on the second coordinate axis, that the hand is located at a side of the wrist joint point facing a positive direction of the second coordinate axis;

determining, under a condition that the first straight line is perpendicular to the first coordinate axis and the coordinate of the elbow joint point on the second coordinate axis is greater than the coordinate of the wrist joint point on the second coordinate axis, that the hand is located at a side of the wrist joint point facing a negative direction of the second coordinate axis;

determining, under a condition that the first straight line is parallel to or obliquely intersects the first coordinate axis and the coordinate of the wrist joint point on the first coordinate axis is greater than the coordinate of the elbow joint point on the first coordinate axis, that the hand is located at a side of the wrist joint point facing a positive direction of the first coordinate axis; and determining, under a condition that the first straight line is parallel to or obliquely intersects the first coordinate axis and the coordinate of the elbow joint point on the first coordinate axis is greater than the coordinate of the wrist joint point on the first coordinate axis, that the hand is located at a side of the wrist joint point facing a negative direction of the first coordinate axis.

* * * * *